United States Patent
Rowe et al.

(10) Patent No.: US 12,463,919 B2
(45) Date of Patent: Nov. 4, 2025

(54) METHOD FOR PREDICTING RESOURCE USAGE FOR APPLICATIONS IN A DISTRIBUTED SYSTEM

(71) Applicants: Robert Bosch GmbH, Stuttgart (DE); Carnegie Mellon University, Pittsburgh, PA (US)

(72) Inventors: Anthony Rowe, Pittsburgh, PA (US); Carlee Joe-Wong, Pittsburgh, PA (US); Michael Pressler, Karlsruhe (DE); Nuno Pereira, Pittsburgh, PA (US); Tianshu Huang, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/509,873

(22) Filed: Nov. 15, 2023

(65) Prior Publication Data
US 2024/0283750 A1    Aug. 22, 2024

(30) Foreign Application Priority Data
Feb. 17, 2023    (DE) ................ 10 2023 201 399.1

(51) Int. Cl.
*H04L 47/83*    (2022.01)
*H04L 41/16*    (2022.01)
*H04L 47/80*    (2022.01)

(52) U.S. Cl.
CPC .............. *H04L 47/83* (2022.05); *H04L 41/16* (2013.01); *H04L 47/805* (2013.01)

(58) Field of Classification Search
CPC ......... H04L 41/40; H04L 41/12; H04L 67/10; H04L 41/145; H04L 41/147; H04L 47/70; H04L 47/83; H04L 47/805; H04L 41/16; G06N 20/00
See application file for complete search history.

(56) References Cited

U.S. PATENT DOCUMENTS

| | | | | |
|---|---|---|---|---|
| 10,681,080 | B1 * | 6/2020 | Chen ..................... | G06F 21/562 |
| 11,579,894 | B2 * | 2/2023 | Enrici .............. | H03K 19/17736 |
| 11,669,386 | B1 * | 6/2023 | Abrol .................. | G06F 11/1076 |
| | | | | 714/15 |
| 11,675,947 | B2 * | 6/2023 | Uscumlic .............. | G06F 30/343 |
| | | | | 716/117 |
| 2016/0283270 | A1 * | 9/2016 | Amaral ................. | G06F 9/5027 |
| 2018/0341518 | A1 * | 11/2018 | Graffy .................... | G06F 9/4843 |
| 2020/0195495 | A1 * | 6/2020 | Parker ..................... | H04L 41/40 |

(Continued)

*Primary Examiner* — Raqiul A Choudhury
(74) *Attorney, Agent, or Firm* — NORTON ROSE FULBRIGHT US LLP

(57) ABSTRACT

A method for predicting resource usage for applications in a distributed system. The method includes: obtaining resource usage data, the resource usage data resulting from measuring the resource usage of different applications on different devices of the distributed system; detecting, by an orchestrator, a change and/or an event in the distributed system that requires a re-configuration of the distributed system; predicting, by the orchestrator, the resource usage of at least one application when deployed on one or different devices of the distributed system, the predicting being carried out based on the obtained resource usage data; initiating the required re-configuration based on the detecting and the predicting.

9 Claims, 6 Drawing Sheets

(56) References Cited

U.S. PATENT DOCUMENTS

| | | | | |
|---|---|---|---|---|
| 2020/0379814 | A1* | 12/2020 | Blagodurov | G06N 3/047 |
| 2021/0240797 | A1* | 8/2021 | Rashid | G06F 9/3001 |
| 2021/0287112 | A1* | 9/2021 | Ramasamy | G06N 5/02 |
| 2021/0392052 | A1* | 12/2021 | Soryal | G06N 20/00 |
| 2022/0129280 | A1* | 4/2022 | Enrici | G06F 9/4411 |
| 2022/0327063 | A1* | 10/2022 | Enrici | H03K 19/17728 |
| 2022/0343046 | A1* | 10/2022 | Uscumlic | G06F 30/343 |
| 2022/0404801 | A1* | 12/2022 | Amaro, Jr. | G05B 19/4155 |
| 2022/0405373 | A1* | 12/2022 | Amaro, Jr. | H04L 9/3263 |
| 2023/0385500 | A1* | 11/2023 | Fischer | G06F 21/76 |
| 2024/0179088 | A1* | 5/2024 | Dhamija | H04L 41/16 |

\* cited by examiner

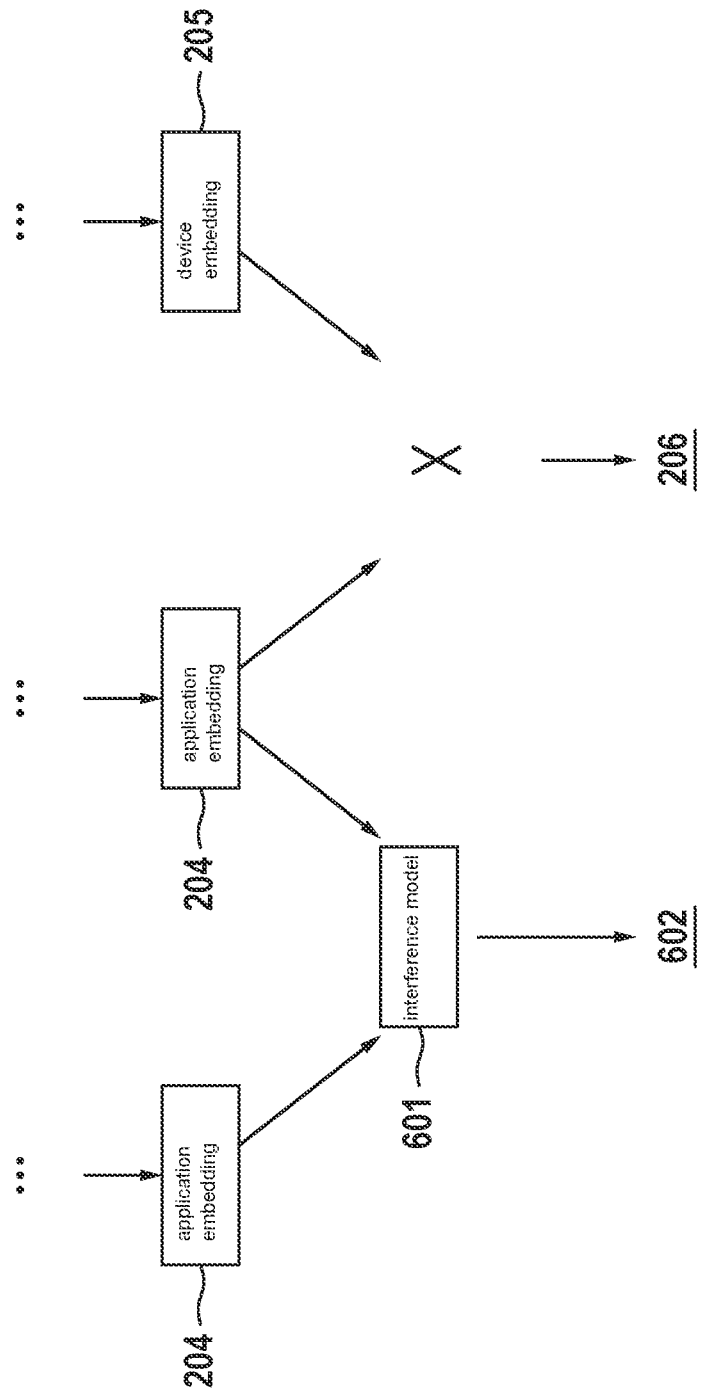

METHOD FOR PREDICTING RESOURCE USAGE FOR APPLICATIONS IN A DISTRIBUTED SYSTEM

CROSS REFERENCE

The present application claims the benefit under 35 U.S.C. § 119 of German Patent Application No. DE 10 2023 201 399.1 filed on Feb. 17, 2023, which is expressly incorporated herein by reference in its entirety.

FIELD

The present invention relates to a method for predicting resource usage for applications in a distributed system. Furthermore, the present invention relates to a computer program as well as a data processing apparatus.

BACKGROUND INFORMATION

Predicting the performance of software components when they are executed on one platform compared to another has long been a challenge due to differences in compiler optimizations, OS performance, and computer hardware architecture. This uncertainty in performance is compounded by interference from other tasks and workload on that system that add additional I/O, and memory in-determinism.

Performance prediction usually refers to execution time, but can also include energy consumption, memory usage and network usage. Classical approaches to this problem include (but are not limited to) measuring worst-case performance, binary analysis, source-code analysis, and ahead-of-time benchmarking on similar targets. Various approaches are available in the related art for predicting and analysing performance. Prediction from static analysis must grapple with the fact that knowing the resource usage of a program is equivalent to knowing its execution path, which reduces to the halting problem. Therefore, static analysis approaches usually operate on a restricted subset of programs using either human annotation or specialized languages that restrict the possibility of hard-to-predict loops, and largely predict worst case execution time. Prediction using dynamic analysis of one device to predict performance on another is difficult because the features that can be gathered at run-time are limited and possibly negatively impact performance. Performance events also do not easily generalize from one architecture to another: new profiling code must be written to access hardware-specific performance counters, and the model may need to be changed to account for a different set of performance events that are available. According to per-device prediction, models predicting the performance of an application on a device using features measured about that application often suffer from higher error, since the resource usage may depend on factors that are not present in the measured features and may be difficult or impossible to measure. This creates an error floor that cannot be naturally reduced as usage of a platform scales and additional data is gathered.

SUMMARY

Aspects of the present invention include a method, a computer program, as well as a data processing apparatus. Features and details of the present invention are disclosed. Features and details described in the context to the method also correspond to the computer program as well as the data processing apparatus, and vice versa in each case.

According to an aspect of the present invention, a method for predicting resource usage for applications in a distributed system is provided. According to an example embodiment of the present invention, the method may comprise obtaining resource usage data. The resource usage data may result from measuring the resource usage of different applications on different devices of the distributed system. For example, in case of bytecode and particular WebAssembly applications, the number of times a bytecode instruction is executed may be measured. The method may further comprise detecting, particularly by an orchestrator, a change and/or an event in the distributed system that requires a re-configuration of the distributed system. Such an event may be a change of hardware and/or an introduction of a new application and/or a change of requirements for the execution of an application. The method may also comprise predicting, particularly by the orchestrator, the resource usage of at least one application (and/or at least one of the applications), preferably when deployed on one or different devices of the distributed system. The predicting may be carried out based on the obtained resource usage data. Furthermore, the method may comprise initiating the required re-configuration based on the detecting, preferably in case the event and/or change has been detected, and the predicting. The resource usage data may be dynamic data that can be used for characterizing the application's performance. This characterization may allow to predict the resource usage of the application on different devices, particularly platforms. It may be possible to check if prediction is correct after deployment and then to adjust the prediction if necessary. Furthermore, the method according to the present invention allows to guarantee resource loading and real time properties of the application. The detected change and/or event may comprise changes such as changes of software and/or hardware and/or changes of real-time requirements and/or new deployments and/or a changed configuration of the distributed system and/or a changed execution mode of the applications.

Furthermore, it is possible that the predicting the resource usage is carried out based on matrix factorization. To this end, according to an example embodiment of the present invention, features for the applications and/or devices may be obtained and combined with features learned by the matrix factorization. In matrix factorization-based prediction, the data of resource usage for applications and devices may be factorized into a low-dimensional product of separate application and device matrices. To perform matrix factorization, features for the application and device may first be collected. These features can include application source code, compiled code, or intermediate representation, device hardware specifications, and performance events observed during dynamic profiling. These features may then be combined with features learned by the matrix factorization in order to predict the resource usage.

According to an example embodiment of the present invention, it is also possible that the re-configuration comprises a deployment and/or mapping of the at least one application. The deployment and/or mapping may be carried out based on the predicted resource usage such that the resource usage is optimized and/or requirements, preferably real time and/or quality of service requirements, for the at least one application are fulfilled. For example, if an execution time is predicted, the orchestrator may use the predicted execution time to improve system deployment and/or mapping to fulfil QOS (i.e., Quality of Service) and/or real time requirements.

The detected change and/or event may comprise at least one of the following:

Introduction of the at least one application as a new application of the distributed system,
Introduction of a new hardware,
Changes of real-time requirements for the applications,
New deployments of applications,
A change of the configuration of the distributed system,
A changed execution mode of the applications,
A change of the applications and/or of the distributed systems, particularly the hardware, that initiates a deployment change,
A prediction and/or deployment of heterogenous implementations to comply with QOS requirements.

The predicted and/or deployed heterogenous implementations and/or the change of the applications and/or of the distributed system may allow to provide more accurate calculations and/or a better compliance with the QOS requirements and/or a better quality of the algorithms and/or a better suitability for hardware accelerators and/or the like. For example, the detected change and/or event may comprise detecting the introduction of a new node into the system, which is more suitable for another implementation of an applications and/or improves the Qos performance. The orchestrator may be suitable to predict and/or deploy these heterogenous implementations.

According to an example embodiment of the present invention, the resource usage data may result from a monitoring of multiple applications. Also, the device data may result from a monitoring of multiple devices. The resource usage data and the device data may be combined, and the combined data may be used for the predicting the resource usage of the at least one, particularly a single, application. It can be an advantage of the present invention to provide the ability to more efficiently pool information from a number of devices and a number of test cases and/or applications to build a corpus of knowledge that can more accurately predict performance as compared to scope single device and test approaches (known as per-device prediction).

Also, according to an example embodiment of the present invention, the obtained resource usage data resulting from different applications and/or different devices may be combined for being used by the predicting the resource usage, particularly using matrix completion techniques. In other words, in order to predict resource usage for an application on a given device, the solution according to the present invention may comprise measuring the resource usage of many applications on many different devices and combine this data, particularly using matrix completion techniques.

It is also possible that the predicting the resource usage comprises applying a machine learning model with the combined data. The combination of application features and learned features may thereby lead to an application embedding and the combination of device features and learned features may lead to a device embedding. Both embeddings can advantageously be used for the prediction.

According to an example embodiment of the present invention, instead of having to obtain each feature by engineering instrumentation into the execution environment or analysing the source code or binary, the features for devices and applications may be obtained implicitly by machine learning. Features for each device may be learned by observing the pattern of execution times of applications collected on test devices, and then comparing them to the pattern of execution times on other devices. Similarly, features for each application may be learned by observing the pattern of execution times of a test application on different devices, and then comparing it to the pattern of execution times of other applications. By allowing features to be learned implicitly in this fashion, it can be possible to indirectly learn any features that are necessary to explain resource usage, even if they cannot be measured directly during static or dynamic analysis. This allows for significantly less engineering effort to be invested in developing feature measurement systems, instead trading off engineering effort for a requirement to collect data.

Furthermore, by increasing the dimensionality of features that can be learned, matrix factorization-based prediction algorithms can improve accuracy by collecting more data, with no intrinsic error floor other than the noise floor of the system.

It may be another important aspect of the present invention that matrix factorization produces a mapping of all applications and devices to an embedding space. This embedding can also be used to train additional models that predict or analyse performance data in other ways, for example, analysing interference between applications. The embedding can also be trained using alternative inputs, for example features which capture the input data behaviour.

According to another aspect of the present invention, referring to the resource prediction, the training and/or inference throughput and/or power consumption and/or other resources of an application and/or of a neural network and/or another GPU-accelerated model running on a GPU, TPU, or other accelerator, may be predicted. Each model may be considered a different application. Application features may be obtained from a graph embedding of the model compute graph, i.e., the neural network architecture, and device features may be obtained from the hardware specifications of the accelerator the network is running on. Since WebAssembly may be carried out on hardware accelerators likes GPUs, the prediction of the resource usage on hardware accelerators brings further advantages.

According to an example embodiment of the present invention, in case the applications are provided as bytecode, the number of times a bytecode instruction is executed may be measured and used as a feature, particularly obtained by dynamic analysis for each application, and hardware descriptions for each device may be recorded and additionally used as a feature. This allows to combine the features with matrix factorization to learn feature embeddings for each application and device to predict the resource usage.

In another aspect of the present invention, a computer program may be provided, in particular a computer program product, comprising instructions which, when the computer program is executed by a computer, cause the computer to carry out the method according to the present invention. Thus, the computer program according to the present invention can have the same advantages as have been described in detail with reference to a method according to the present invention.

In another aspect of the present invention an apparatus for data processing may be provided, which is configured to execute the method according to the present invention. As the apparatus, for example, a computer can be provided which executes the computer program according to the present invention. The computer may include at least one processor that can be used to execute the computer program. Also, a non-volatile data memory may be provided in which the computer program may be stored and from which the computer program may be read by the processor for being carried out.

According to another aspect of the present invention a computer-readable storage medium may be provided which comprises the computer program according to the present invention. The storage medium may be formed as a data storage device such as a hard disk and/or a non-volatile memory and/or a memory card and/or a solid-state drive. The storage medium may, for example, be integrated into the computer.

Furthermore, the method according to the present invention may be implemented as a computer-implemented method.

Further advantages, features and details of the present invention will be apparent from the following description, in which embodiments of the present invention are described in detail with reference to the figures. In this context, the features mentioned herein may each be essential to the present invention individually or in any combination.

BRIEF DESCRIPTION OF THE DRAWINGS

FIG. 6 shows an application of Matrix Factorization embedding to interference prediction.

DETAILED DESCRIPTION OF EXAMPLE EMBODIMENTS

In the following figures, the identical reference signs are used for the same technical features even of different embodiment examples.

Figure 1:
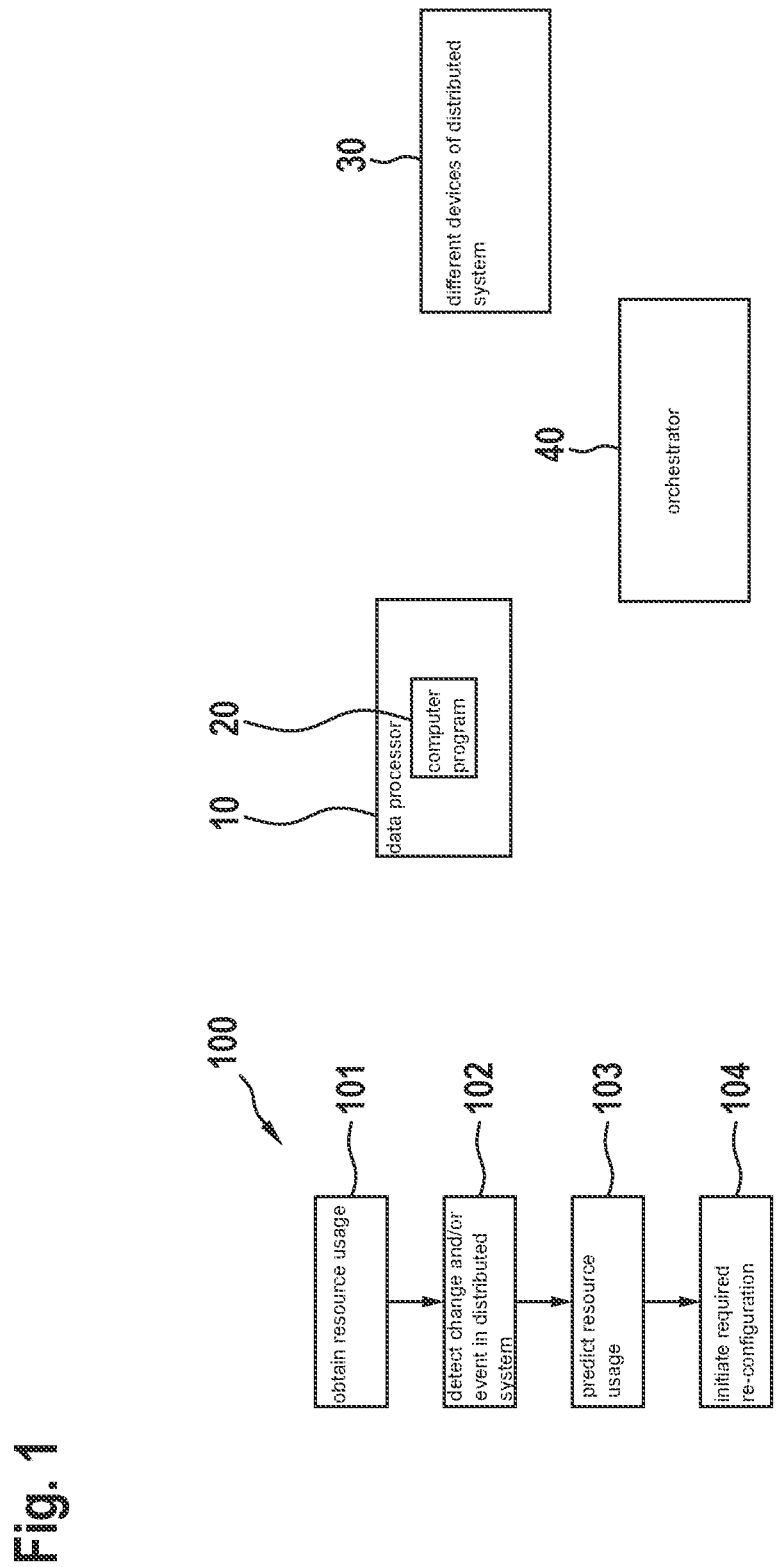
FIG. 1 shows exemplarily embodiments of the present invention.

FIG. 1 shows a method 100, computer program 20 and apparatus for data processing 10 according to embodiments of the present invention, each for predicting resource usage for applications in a distributed system 1. According to a first method step 101, resource usage data may be obtained. To this end, the resource usage data may result from measuring the resource usage of different applications on different devices 30 of the distributed system 1. According to a second method step 102, a detecting 102 of a change and/or an event in the distributed system 1 may be carried out by an orchestrator 40. The detected change and/or event may require a re-configuration of the distributed system 1.

For the preparation of the re-configuration, according to a third method step 103, the resource usage of at least one application when deployed on one or different devices 30 of the distributed system 1 may be predicted. The predicting 103 may be carried out based on the obtained resource usage data. A fourth method step 104 may comprise initiating the required re-configuration based on the detecting 102 and the predicting 103.

Figure 2:
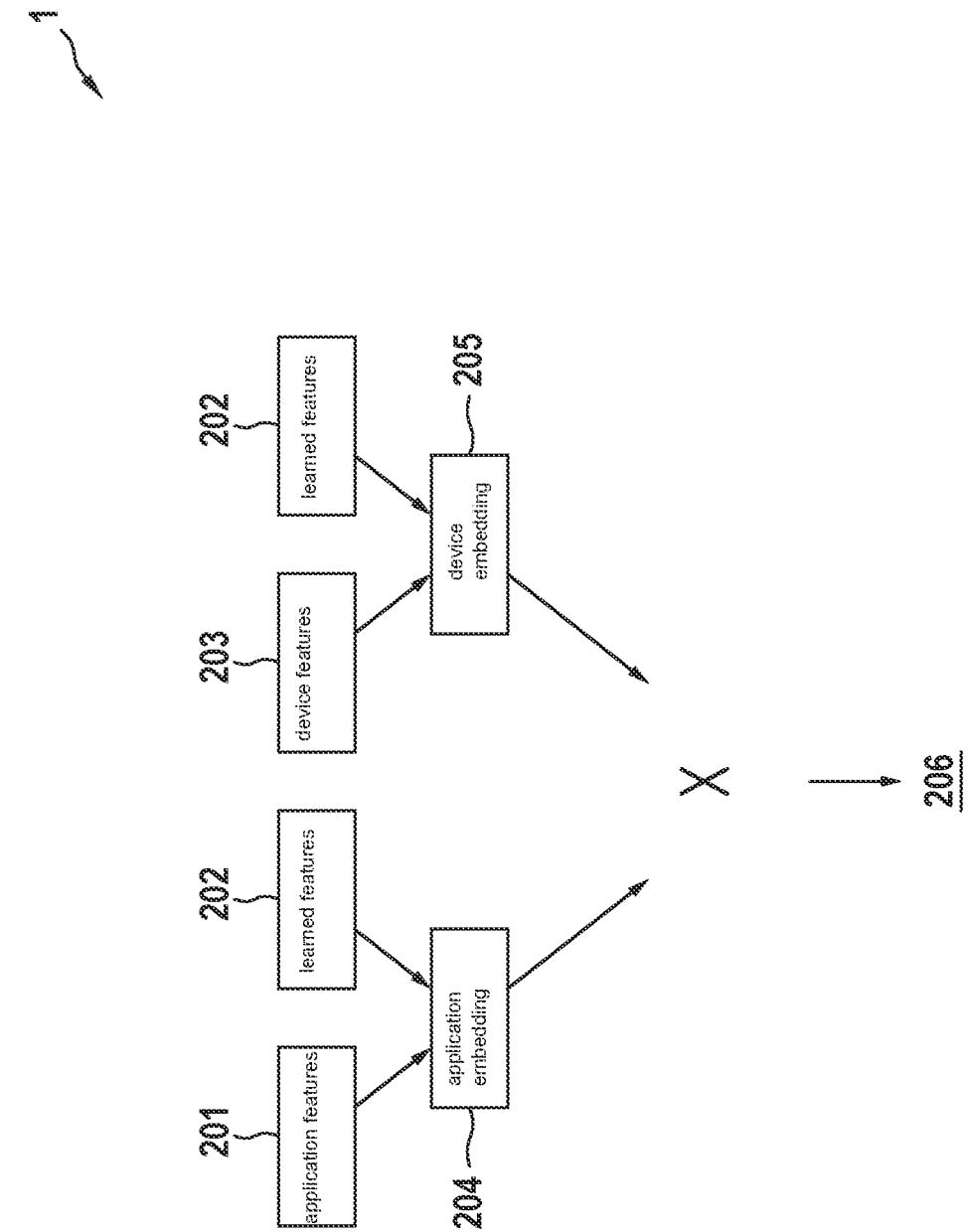
FIG. 2 shows a basic Structure of Resource Prediction using Matrix Factorization.

For predicting resource usage for an application on a given device, the solution according to embodiments of the present invention may comprise measuring the resource usage of many applications on many different devices and combine this data using matrix completion techniques. In matrix factorization-based prediction, as shown schematically in FIGS. 2 and 3, the matrix of resource usage for applications (rows) and devices (columns) is factorized into a low-dimensional product of separate application and device matrices. To perform matrix factorization, features for the application (application features 201) and device (device features 203) are first collected. These features can include application source code, compiled code, or intermediate representation, device hardware specifications, and performance events observed during dynamic profiling. These features are then combined with features learned by matrix factorization in order to predict the resource usage. In other words, the combination of application features 201 and learned features 202 leads to an application embedding 204 and the combination of device features 203 and learned features 202 leads to a device embedding 205, both embeddings 204, 205 being used for the prediction 206.

Matrix factorization may be solved using alternating minimization, which can be applied if application and device features are related linearly to the resource usage. In these approaches, the application features are first analytically optimized while keeping the device features constant. Then, device features are analytically optimized while keeping application features constant. These two steps swap until convergence. Alternatively, Gradient Descent or Stochastic Gradient Descent can also be used. Gradient-based optimization can learn arbitrary nonlinear relationships, learning application and device features simultaneously, which provides a more flexible approach.

Figure 3:
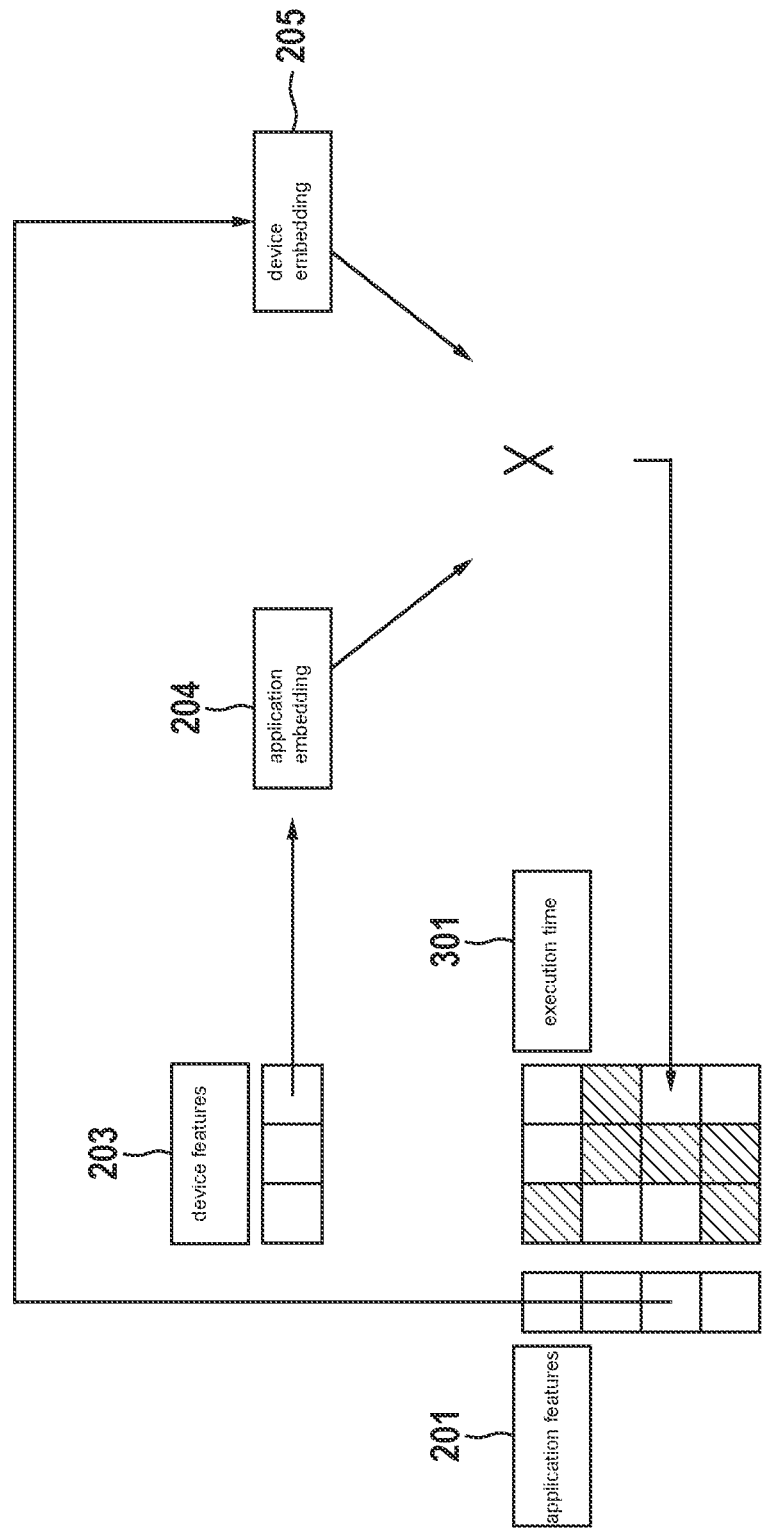
FIG. 3 shows an illustration of the Matrix Factorization Procedure.

In FIG. 3, a simple example is shown where four applications are shown as rows and three devices are shown as columns. In this example, it can be a goal to predict the execution time 301 of each application on each device. It may be started by gathering any available features 201,203 about the applications (such as instruction count) and devices (such as CPU microarchitecture, frequency, etc. . . . ). Then, applications on some fraction of the devices may be executed, shown in FIG. 3 as the 6 filled-in cells in the matrix. The execution time of the applications observed is then used to train a matrix factorization that takes the features as input. In this small example, it can also make sense to just execute all four applications on all three devices, for a total of 12 executions. However, if the number of applications and devices were very large, this would become impractical, which in turn makes matrix factorization a compelling approach to resource estimation.

For example, in case a new application enters a system of connected, heterogenous nodes, an entity like a central system orchestrator may choose an initial execution node the application. Then, key runtime indicators may be monitored by the node and fed back to the system orchestrator. Subsequently, the system orchestrator may predict the execution time of the application by the matrix factorization techniques. Afterwards, the orchestrator may use the predicted execution time to improve system deployment and/or mapping to fulfil QoS (i.e., Quality of Service) and/or real time requirements. If the application is executed on nodes where the execution time was predicted, the dynamic measured features may be updated and can be fed back to the prediction mechanism.

According to another case, a new node may enter the system and an existing application, or a test application may be deployed on the new node and the features are fed back to the central orchestrator. The orchestrator may predict the execution time of all existing applications based on the (test) application results. Then, as a result, the orchestrator may rearrange the deployment and/or mapping of all applications to optimize the performance and/or QOS requirements of the overall system.

Also, embodiments of the present invention may be used for other possibilities, where the entity may also be the user itself with a (de-)centralized orchestrator and/or the data could be derived by e.g., bytecode features before executing the application or other information described below.

Figure 4:
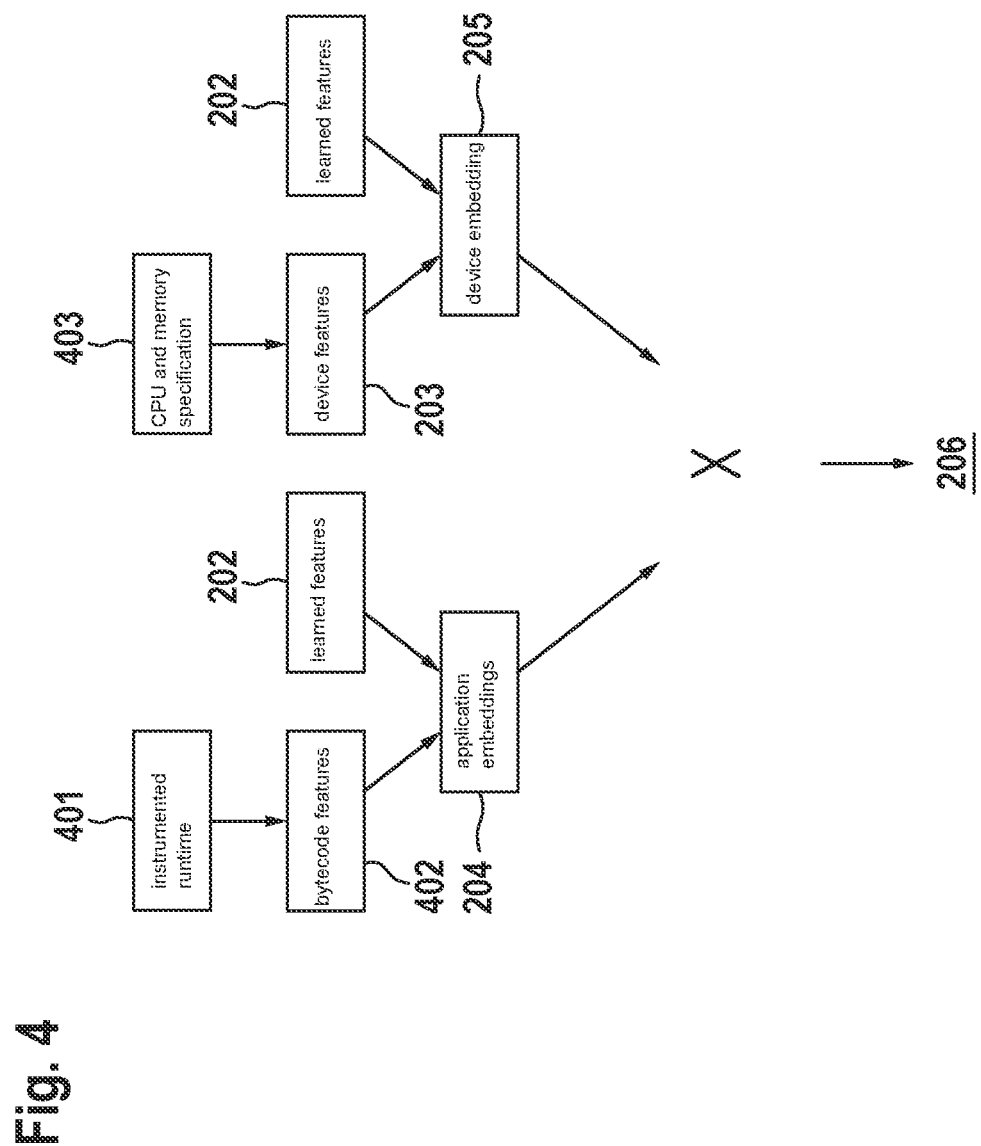
FIG. 4 shows an application of Resource Prediction using Matrix Factorization on WebAssembly applications running on heterogeneous systems.

According to FIG. 4, an application of resource prediction with bytecode features is visualized, particularly using matrix factorization on WebAssembly applications running on heterogeneous systems. In one implementation of resource prediction by matrix factorization, the execution time or power consumption may be predicted for binary applications. In this embodiment, the number of times each bytecode instruction is executed may be measured and used as a feature obtained by dynamic analysis for each application. Then, hardware descriptions for each device may be recorded. These features may be combined with matrix factorization to learn feature embeddings for each application and device that predict the resource usage. In FIG. 4, the instrumented runtime 401 may lead to the bytecode features 402 and a CPU and memory specification 403 may lead to the device features 203.

According to another embodiment of the present invention, referring to a resource prediction with compiler-based features, a compiler intermediate representation such as LLVM IR can be parsed by a graph algorithm such as a Graph Neural Network and used as static analysis input features, again learning the execution time or power consumption.

According to another embodiment of the present invention, referring to resource prediction with neural networks, the training or inference throughput or power consumption of a neural network or other GPU-accelerated model running on a GPU, TPU, or other accelerator, may be predicted. Each model may be considered a different application. Application features may be obtained from a graph embedding of the model compute graph, i.e., the neural network architecture, and device features may be obtained from the hardware specifications of the accelerator the network is running on.

Figure 5:
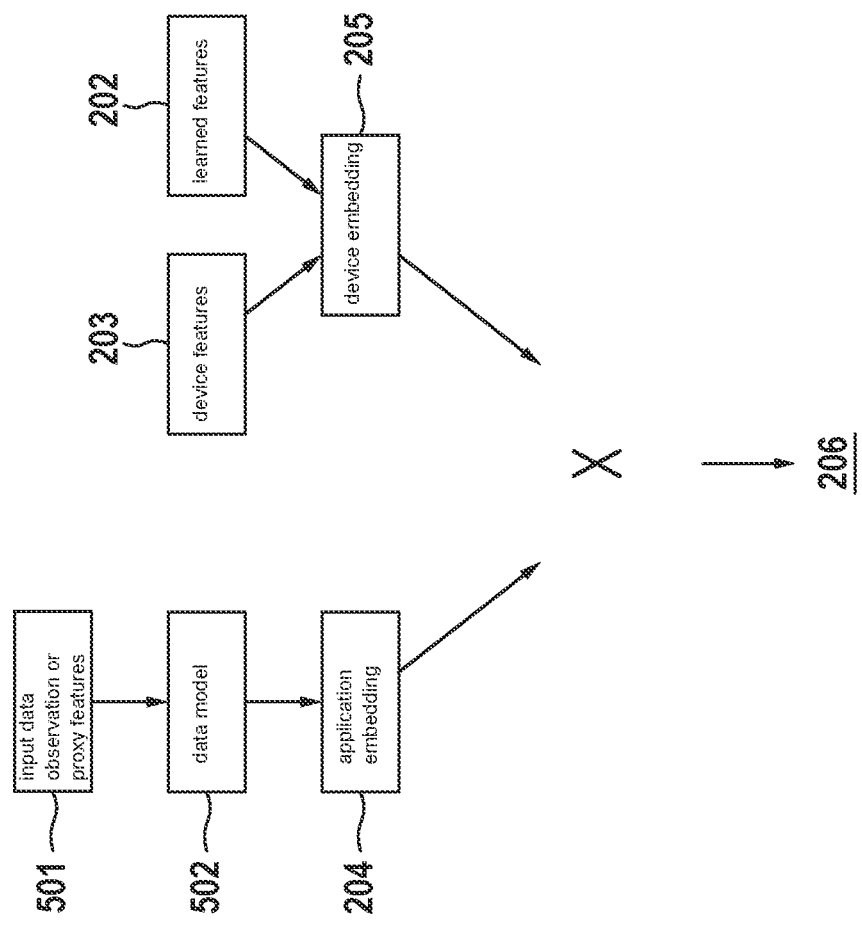
FIG. 5 shows a modification of Matrix Factorization to predict resources which depend on input data.

In FIG. 5, it is shown that the modification of matrix factorization to predict resources can be dependent on the input data. One example that leverages the flexibility of the matrix factorization embeddings is predicting the resources used by applications under dynamic data inputs. Suppose the input data observation or proxy features 501 that capture input data information can be observed, this input data could be the number of entities of different types in a virtual twin simulation or game server, or instrumentation that counts the number of times major code branches are executed. Instead of using a model that computes application embeddings from fixed features obtained through prior analysis, a data model 502 that computes module embeddings on the fly can be used based on varying input data observations. The expression modules may refer to single programs like WebAssembly programs.

According to FIG. 6, application interference is visualized, where interference between applications running on the same processor may be of major concern to applications co-located on edge systems. Predicting this interference 602 can also be done using the matrix factorization embeddings: instead of having to determine the relationship between execution characteristics and input features from scratch, an interference model 601 can be trained on the embeddings produced by matrix factorization.

The matrix completion problem may be formulated as follows: Modules (e.g. WebAssembly programs) may be indexed i=1, 2, ... $N_m$, and each have "side information" $x_m^{(i)}$ with some features associated with each module. A count of the number of times each WebAssembly opcode is executed may be used, which could be generalized to other bytecode instruction sets such as Java. Devices may be indexed j=1, 2, ... $N_d$, and can be similarly associated with "side information" $x_d^{(j)}$ that capture any available information about the devices. Runtimes $C_{ij}^*$ of module i running on device j for some subset $A \subset \{1, 2, ... N_m\} \times \{1, 2, ... N_d\}$ of (module, device) pairs may be observed. Then, it can be tried to predict $C_{ij}$ for unobserved entries i,j∉ A.

In this formulation, it may be assumed that programs either have the same input data each iteration or perform computations that do not depend on the input data. Programs taking alternate input data may be treated as being separate programs. It can also be assumed that devices do not vary over time, and different power modes should be treated as separate devices. The prediction may be carried out by predicting the log execution time $\log(C^{ij})$, and use the $l_2$-log objective $$\mathcal{L} = \sum_{(i,j) \in \mathcal{A}} \left\| \log(C_{ij}^*) - \log(\hat{C}_{ij}) \right\|_2^2$$

which can be interpreted as fitting an objective related to the relative error of each data point.

Embodiments of the present invention may be used for edge-orchestration frameworks or cloud orchestration frameworks. Also, application mapping in heterogeneous compute nodes (in a SoC or a distributed environment in general) or predicting performance for app stores as well as specify performance when migrating and/or developing for new platforms may be possible application.

Matrix Factorization techniques decompose a partially observed low-rank target matrix into the product of multiple matrices. In the common case of decomposing a matrix into two matrices $C=MD^T$, matrix factorization represents each element $C_{ij}$ as the inner product $m_i^T d_j$ of the corresponding rows $m_i$ in M and $d_j$ in D. This approach learns a common "embedding space" for all modules and devices: modules and devices with similar execution behaviour should respectively have similar $m_i$ and $d_j$ embeddings.

The residual using matrix factorization may be predicted with device and module embeddings derived from the device and module side information. A "two-tower" neural network architecture may be used to help handle nonlinearity with respect to the side information. Specifically, the module and device embeddings $m_i, d_j \in \mathbb{R}^r$ are given by $$m_i = f_m(u_m^{(i)}, x_m^{(i)}; w_m),$$
$$d_j = f_d(u_d^{(j)}, x_d^{(j)}; w_d),$$

where $f_m$ and $f_d$ are multi-layer perceptrons (MLPs) with weights $w_m$ and $w_d$ that output embeddings $m_i$ and di. The matrix factorization term is then added to the baseline to obtain the final runtime prediction $\log(\hat{C}_{ij})$ for module i on device j:

$$\log(\hat{C}_{ij}) = \log(\overline{C}_{ij}) + m_i^T d_j.$$

In the proposed model, $u_m^{(i)}, u_d^{(j)} \in \mathbb{R}^q$ are additional trainable parameters associated with each module and device respectively that are appended to side information $x_m^{(i)}$ and $x_d^{(j)}$ in order to allow the model to capture information that cannot be expressed as a function of the input features. This could occur if two modules have the same instructions but in different order with significantly different memory access patterns, or if two devices have the same CPU specifications but differ in a harder-to-measure way such as main memory latency. The model parameters $\{w_m, w_d, u_m, u_d\}$ may be jointly learned using Stochastic Gradient Descent. Since data efficiency may be critical, the 10-fold cross validation can be run on the training set, and the mean validation error may be used as the criteria to stop training on all replicates. The mean prediction over all k-fold replicates is then used as the final prediction.

The foregoing explanation of the embodiments describes the present invention in the context of examples. Of course, individual features of the embodiments can be freely combined with each other, provided that this is technically reasonable, without leaving the scope of the present invention.

What is claimed is:

1. A method for predicting resource usage for applications in a distributed system, comprising the following steps:
   obtaining resource usage data, the resource usage data resulting from measuring resource usage of different applications on different devices of the distributed system;
   detecting, by an orchestrator, a change and/or an event in the distributed system that requires a re-configuration of the distributed system;
   predicting, by the orchestrator, the resource usage of at least one application when deployed on one or different devices of the distributed system, the predicting being carried out based on the obtained resource usage data;
   and initiating the required re-configuration based on the detecting and the predicting, wherein the predicting of the resource usage is carried out based on matrix factorization, wherein features for the applications and devices are obtained and combined with features learned by the matrix factorization for the predicting of the resource usage.

2. The method of claim 1, wherein the re-configuration includes a deployment and/or mapping of the at least one application, the deployment and/or mapping being carried out based on the predicted resource usage such that the resource usage is optimized and/or requirements including real time and/or quality of service requirements for the at least one application are fulfilled.

3. The method of claim 1, wherein the detected change and/or event includes at least one of the following:
   introduction of the at least one application as a new application of the distributed system,
   introduction of a new hardware,
   changes of real-time requirements for the applications,
   new deployments of applications,
   a change of the configuration of the distributed system,
   a changed execution mode of the applications.

4. The method of claim 1, wherein the resource usage data resulting from a monitoring of multiple applications and/or device data resulting from a monitoring of multiple devices is combined, the combined data being used for the predicting the resource usage of the at least one application.

5. The method of claim 1, wherein the obtained resource usage data resulting from different applications and/or different devices is combined for being used by the predicting the resource usage, using matrix completion techniques.

6. The method of claim 5, wherein the predicting of the resource usage includes applying a machine learning model with the combined data.

7. The method of claim 1, wherein the applications are provided as bytecode, a number of times a bytecode instruction is executed being measured and used as a feature obtained by dynamic analysis for each application, and hardware descriptions for each device being recorded and additionally used as a feature, the features being combined with matrix factorization to learn feature embeddings for each application and device to predict the resource usage.

8. A non-transitory computer-readable medium on which is stored a computer program including instructions for predicting resource usage for applications in a distributed system, the instructions, when executed by a computer, causing the computer to perform the following steps:
   obtaining resource usage data, the resource usage data resulting from measuring resource usage of different applications on different devices of the distributed system;
   detecting, by an orchestrator, a change and/or an event in the distributed system that requires a re-configuration of the distributed system;
   predicting, by the orchestrator, the resource usage of at least one application when deployed on one or different devices of the distributed system, the predicting being carried out based on the obtained resource usage data;
   and initiating the required re-configuration based on the detecting and the predicting, wherein the predicting of the resource usage is carried out based on matrix factorization, wherein features for the applications and devices are obtained and combined with features learned by the matrix factorization for the predicting of the resource usage.

9. A data processing apparatus configured to predict resource usage for applications in a distributed system, the data processing apparatus configured to:
   obtain resource usage data, the resource usage data resulting from measuring resource usage of different applications on different devices of the distributed system;
   detect, by an orchestrator, a change and/or an event in the distributed system that requires a re-configuration of the distributed system;
   predict, by the orchestrator, the resource usage of at least one application when deployed on one or different devices of the distributed system, the predicting being carried out based on the obtained resource usage data;
   and initiate the required re-configuration based on the detecting and the predicting, wherein the predicting of the resource usage is carried out based on matrix factorization, wherein features for the applications and devices are obtained and combined with features learned by the matrix factorization for the predicting of the resource usage.

* * * * *